(12) United States Patent
Reznic (10) Patent No.: US 11,323,713 B2
(45) Date of Patent: May 3, 2022

(54) BIT RATE REDUCTION FOR SCALABLE VIDEO CODING

(71) Applicant: Amimon Ltd., Ra'anana (IL)

(72) Inventor: Zvi Reznic, Tel Aviv (IL)

(73) Assignee: AMIMON LTD., Ra'anana (IL)

( * ) Notice: Subject to any disclaimer, the term of this patent is extended or adjusted under 35 U.S.C. 154(b) by 0 days.

(21) Appl. No.: 17/051,210

(22) PCT Filed: May 14, 2019

(86) PCT No.: PCT/IL2019/050540
§ 371 (c)(1),
(2) Date: Oct. 28, 2020

(87) PCT Pub. No.: WO2019/220432
PCT Pub. Date: Nov. 21, 2019

(65) Prior Publication Data
US 2021/0377536 A1 Dec. 2, 2021

Related U.S. Application Data

(60) Provisional application No. 62/800,504, filed on Feb. 3, 2019, provisional application No. 62/777,159, filed
(Continued)

(51) Int. Cl.
*H04N 19/124* (2014.01)
*H04N 19/122* (2014.01)
*H04N 19/176* (2014.01)
*H04N 19/18* (2014.01)
*H04N 19/91* (2014.01)
(Continued)

(52) U.S. Cl.
CPC ......... *H04N 19/124* (2014.11); *H04N 19/122* (2014.11); *H04N 19/129* (2014.11);
(Continued)

(58) Field of Classification Search
None
See application file for complete search history.

(56) References Cited

U.S. PATENT DOCUMENTS

| 2003/0002579 A1 | 1/2003 | Radha |
| 2004/0218820 A1 | 11/2004 | Mitchell |

(Continued)

FOREIGN PATENT DOCUMENTS

| EP | 0443114 A2 * | 8/1991 | ............. H04N 19/18 |
| WO | 2018/025211 A1 | 2/2018 | |

OTHER PUBLICATIONS

International Search Report in PCT/IL2019/050540, dated Oct. 28, 2019.
(Continued)

*Primary Examiner* — Lindsay J Uhl
(74) *Attorney, Agent, or Firm* — Eitan Mehulal Sadot (57) ABSTRACT

A wireless video transmission system includes: a coarse compression module to compress a video sub-frame and to generate coarse data of the video sub-frame; a coarse decompression module to generate a coarse sub-frame from the coarse data; an error frame extractor to generate an error sub-frame from the coarse sub-frame and from the video sub-frame; a refinement data encoder to generate a set of transform coefficients from the error sub-frame, and to select a subset of transform coefficients from the set of transform coefficients according to an end-of-block (EOB) indication in the coarse data; and a data combining and modulation module to combine and transmit the coarse data and a refinement data including the subset of transform coefficients.

10 Claims, 4 Drawing Sheets

Related U.S. Application Data on Dec. 9, 2018, provisional application No. 62/675,778, filed on May 24, 2018, provisional application No. 62/672,889, filed on May 17, 2018.

(51) Int. Cl.
  *H04N 19/129* (2014.01)
  *H04N 19/159* (2014.01)
  *H04N 19/88* (2014.01)

(52) U.S. Cl.
  CPC ......... *H04N 19/159* (2014.11); *H04N 19/176* (2014.11); *H04N 19/18* (2014.11); *H04N 19/88* (2014.11); *H04N 19/91* (2014.11)

(56) References Cited

U.S. PATENT DOCUMENTS

2006/0078049 A1* 4/2006 Bao .............. H04N 19/13
  375/E7.184
2009/0097548 A1* 4/2009 Karczewicz .......... H04N 19/93
  375/240.03

OTHER PUBLICATIONS

Written Opinion of the International Searching Authority in PCT/IL2019/050540, dated Oct. 28, 2019.

* cited by examiner

BIT RATE REDUCTION FOR SCALABLE VIDEO CODING

CROSS-REFERENCE TO RELATED APPLICATIONS

This patent application is a National Stage of PCT international application number PCT/IL2019/050540, having an international filing date of May 14, 2019, published as international publication number WO 2019/220432 A1, which is hereby incorporated by reference in its entirety; which in turn claims priority and benefit: (I) from U.S. 62/672,889, filed on May 17, 2018; and (II) from U.S. 62/675,778, filed on May 24, 2018; and (III) from U.S. 62/777,159, filed on Dec. 9, 2018; and (IV) from U.S. 62/800,504, filed on Feb. 3, 2019; all of which are hereby incorporated by reference in their entirety.

FIELD

The present invention relates to video communications generally and more particularly to a system for hierarchal video transmission and reception.

BACKGROUND

In some applications such as, for example, home AV (Audio-Video) systems, two-piece TV, VR (Virtual Reality), AR (Augmented Reality) and MR (Mixed Reality), there may be a need to wirelessly transmit raw video. In many cases, the video may be generated in an uncompressed manner (e.g. by a GPU overlaying graphics over movies) such that the input to the wireless system at one end may consist of pixels and the output of the system at the other end may be a reproduction of the input pixels.

These wireless systems should generally provide for relatively high quality where the output pixels are as similar as possible to the input pixels. The systems should additionally provide for relatively low latency where the total delay of the transmission is low and for relatively high robustness to temporal degradations in the capacity of the wireless channel. They are generally configured to include a video encoder and a wireless transmitter. The video encoder may be based on a known compression standard such as, for example, H.264 or H.265. An advantage of using compression schemes based on known compression standards is that there is a relatively large offering of commercially available designs which may be purchased as HW and/or SW and may be integrated into new or existing systems. This may facilitate the development of "standard-compression" based systems. The wireless transmitter may additionally include a modem which may be based on a known communication standard such as, for example, Wi-Fi.

In the wireless systems, tradeoffs are generally required between quality, latency, and robustness. To improve the tradeoff between quality, latency and robustness, methods of Joint-Source-Channel-Coding (JSCC) where introduced. Consequently, the systems may utilize the wireless spectrum efficiently.

SUMMARY

There is provided, in accordance with an embodiment of the present invention, a wireless video transmission system including a coarse compression module to compress a video sub-frame and to generate coarse data of the video sub-frame, a coarse decompression module to generate a coarse sub-frame from the coarse data, an error frame extractor to generate an error sub-frame from the coarse sub-frame and from the video sub-frame, a refinement data encoder to generate a set of transform coefficients from the error sub-frame and to select a subset of transform coefficients from the set of transform coefficients according to an end-of-block (EOB) indication in the coarse data, and a data combining and modulation module to combine and transmit the coarse data and a refinement data including the subset of transform coefficients.

In some embodiments, the refinement data encoder is adapted to identify the EOB indication in the coarse data. Optionally, the EOB indication corresponds to a location of a transform coefficient having the last non-zero value in the coarse data. Optionally, the set of transform coefficients are DCT coefficients.

In some embodiments, the refinement data encoder is adapted to reorder the set of transform coefficients in a pre-defined order.

In some embodiments, the coarse compression module is adapted to use interframe prediction.

In some embodiments, the refinement data encoder selects the subset of transform coefficients according to a predefined function of EOB indications. Optionally, the function of EOB indications is implemented with a look-up-table.

In some embodiments, the refinement data encoder selects the subset of transform coefficients according to a predefined allocation of transform coefficients.

In some embodiments, the coarse compression module divides the video sub-frame into superblocks.

There is provided, in accordance with an embodiment of the present invention, a method of wireless video transmission, the method includes compressing a video sub-frame to generate coarse data of the video frame, generating a coarse sub-frame from the coarse data, generating an error sub-frame from the coarse sub-frame and from the video sub-frame, generating a set of transform coefficients from the error sub-frame and selecting a subset of transform coefficients from the set of transform coefficients according to an end-of-block (EOB) indication in the coarse data, and combining and transmitting the coarse data and a refinement data, wherein the refinement data includes a description of the subset of transform coefficients.

In some embodiments, the method includes identifying the EOB indication in the coarse data. Optionally, the EOB indication corresponds to a location of a transform coefficient having the last non-zero value in the coarse data. Optionally, the set of transform coefficients are DCT coefficients.

In some embodiments, the method includes reordering the set of transform coefficients.

In some embodiments, the compressing includes using interframe prediction.

In some embodiments, the method includes selecting the subset of transform coefficients according to a predefined function of EOB indications. Optionally, the function of EOB indications is implemented with a look-up-table.

In some embodiments, the method includes selecting the subset of transform coefficients according to a predefined allocation of transform coefficients.

In some embodiments, the method includes dividing the video sub-frame into superblocks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

When referring to blocks hereinafter in the detailed description, these may refer to a rectangular of pixels having size of 8×8, 16×16, 32×32, and 64×64. The block may include a single color, for example, a 8×8 block of red (R), or 8×8 block of green (G), or 8×8 block of blue (B), or it may include a block of 3 colors, for example 8×8×3 containing all 3 colors. RGB. It may also include a 3 color block after chroma decimation, for example, one sub-frame which includes one block of 16×16 of Y, one block of 8×8 of Cr, and one block of 8×8 of Cb. The term block hereinafter may be used interchangeably with "sub-frame".

Applicants have realized that existing wireless video transmission systems which combine use of JSCC with known compression block techniques including compression standards such as, for example, H.265, may suffer from bandwidth overhead. For example, consider a system which may combine H.265 data with "analog" refinement. The system may employ "coarse" bins and "fine" bins where the coarse bins are used for sending H.265 data (including interframe prediction) and the fine bins are used for sending data for memoryless refinement of the received image. To send the refinement data, variable length frames (VLF) may be used but there is a drawback associated with the use of VLF as bandwidth overhead is required to describe the number of taps per block that are being sent. In another example, consider a system which may combine H.265 with Scalable Video Coding (SVC). The system may include a two-layer system where Layer 0 is used for the H.265 data (coarse data) and Layer 1 is used for the refinement data. In Layer 1 an end-of-block (EOB) indication is required for each block transmitted but there is a drawback as bandwidth overhead is required for the EOB indication.

Applicants have realized that bandwidth overhead in video transmission systems combining use of known compression block techniques (e.g. H.264 or H.265) with JSCC may be reduced, optionally eliminated, by utilizing information associated with the coarse data to generate refinement data which may be transmitted to a video receiver for memoryless refinement of a video image. The transmission side may include a refinement encoder which may be adapted to perform a two-dimensional DCT transform on an error frame generated from the coarse data to generate DCT taps for each block. The refinement encoder may additionally select a subset of the DCT taps from each block based on the EOB indicator of the coarse data to generate the refinement data. The refinement data may then be transmitted with the coarse data to the receiver which may decode the received refinement data based on the EOB indicator of the transmitted coarse data, thereby allowing VLF to be transmitted without bandwidth overhead.

Applicants have also realized that bandwidth overhead in video transmission systems based on SVC can be reduced, optionally eliminated, by utilizing information associated with the coarse data (level 0 data) to generate refinement data (level 1 data) which may be transmitted to a video receiver for refinement of a video image. The transmission side may include a refinement encoder which may be adapted to perform a two-dimensional DCT transform on an error frame generated from the coarse data to generate DCT taps for each block. The refinement encoder may additionally select a subset of the DCT taps from each block based on the EOB indicator of the coarse data to generate the refinement data. The refinement data may then be transmitted with the coarse data to the receiver which may decode the received refinement data based on the EOB indicator of the transmitted coarse data, thereby saving the need to include EOB data in the refinement data.

Figure 1:
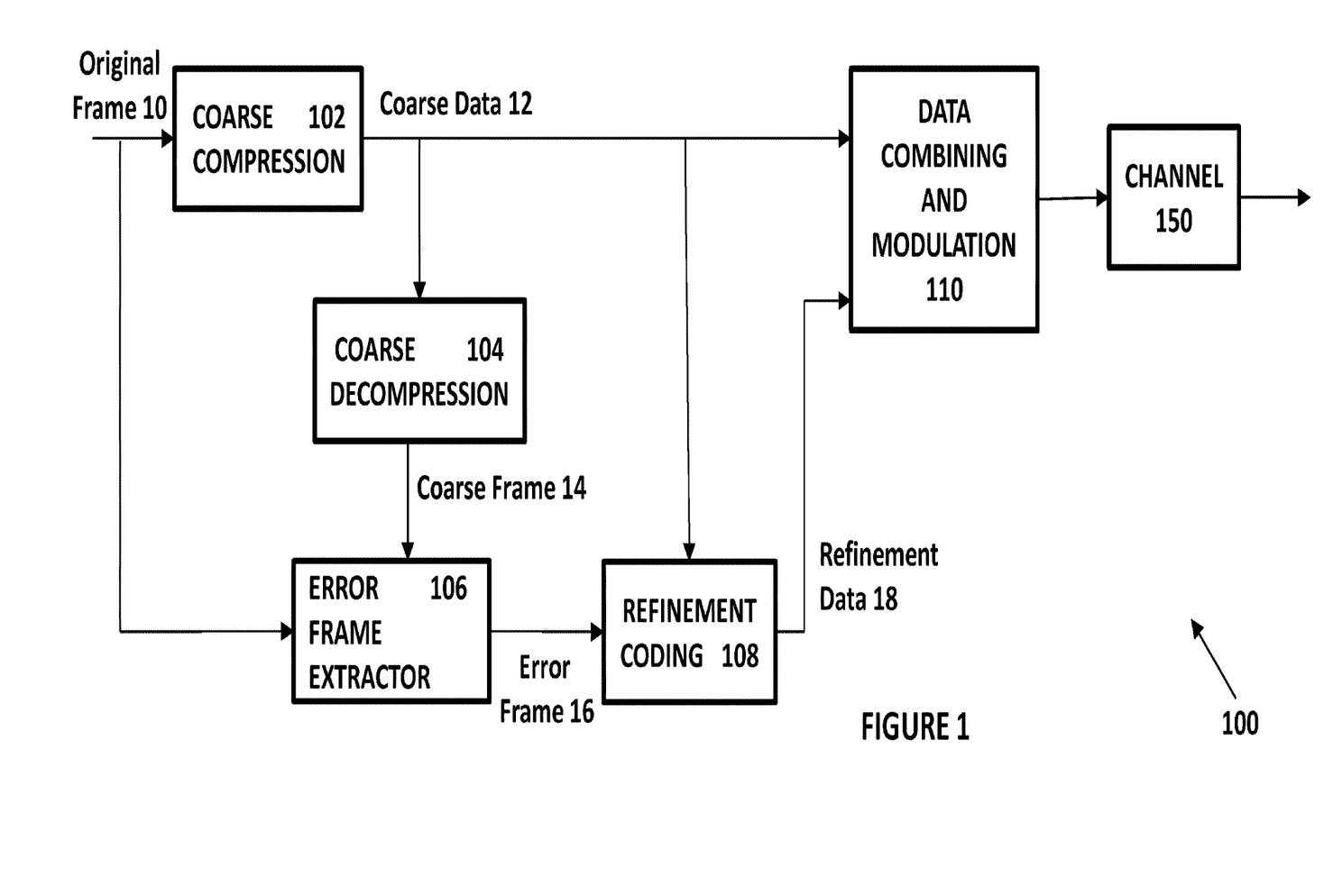
FIG. 1 schematically illustrates an exemplary two-layer video compression and transmission system for transmitting video over a communication channel, according to an embodiment of the present invention.

In some embodiments, the EOB location of the level 0 data may be used as an input to a predictor for the EOB location of the level 1 data, such a prediction available both at the transmitter side and receiver side. The level 1 data encoder may choose an EOB location which is different that the EOB location predicted by the predictor, and may signal to the receiver the difference between the predicted EOB location and the actual EOB location of the level 1 data. Reference is now made to FIG. 1 which schematically illustrates an exemplary two-layer video compression and transmission system 100 for transmitting video over a communication channel 150, according to an embodiment of the present invention. System 100 may include a coarse compression module 102, a coarse decompression module 104, an error frame extractor module 106, a refinement coding module 108, a data combining and modulation module 110.

Coarse compression module 102 may receive pixels of an original video frame 10 and may generate a compressed description of the video which may be denoted as coarse data 12. Coarse compression module 102 may use inter-frame prediction in performing the data compression to generate coarse data 12. Inter frame prediction may include use a forward inter-frame predictor to generate P-frames and optionally a bi-directional inter-frame predictor to generate B-frames. In order to reduce latency, coarse compression module 102 may wholly or partially avoid generating B-frames (bidirectionally predicted frames). Coarse decompression module 104 may parse and decode the coarse data 12 to generate a coarse frame 14.

Error frame extractor module 106 may compare original frame 10 to coarse frame 14 and may generate an error frame 16. To generate the error frame, error frame extractor 106 may perform pixel subtraction optionally followed by addition of a fixed offset and optional limiting. For example, a first pixel in a first line in original frame 10 may have RGB values of 98, 61 and 80, and in coarse frame 14 the same pixel may have the values of 100, 60 and 80. The error frame extractor module 106 may add an offset of 128 to the difference, and may additionally limit the result from the bottom by 0 and from the top by 255. As a result, the first pixel in the first line in error frame 16 may be min (255, max (0, 128+98−100, 128+61−60, 128+80−80))=126,129,128. Alternatively, the error frame extractor may operate in the DCT domain, and subtract the DCT taps of the original frame from the DCT taps of the coarse frame.

Refinement coding module 108 may compress error frame 16 and may generate a refinement data description (refinement data 18). Refinement coding module 108 may adapt its coding parameters according to the content of the coarse data. For example, it may perform two dimensional DCT and may send only a subset of the DCT taps, for example, the first N taps. It may additionally select the value of N based on the coarse description of that block according to a pre-defined algorithm for selecting N. Since the coarse data is transmitted as well, the receiver may select the same value of N, for decoding the refinement data according to a pre-defined algorithm for selecting N, which is equivalent to the pre-defined algorithm in the encoder. This may eliminate the need to specifically encode and send the value of N.

It may be appreciated that the value of N is generally conveyed to the decoder implicitly by inserting an End-of-Block (EOB) indication to the bit stream which describes the DCT taps. For example, in JPEG and in MPEG, EOB is used. The above-mentioned method for eliminating the need to send N may also be viewed as a method for eliminating the need to send the EOB indication in the refinement code.

Data combining and modulation module 110 may combine coarse data 12 and refinement data 18, and may transmit them over a communication channel 150. Data combining and modulation module 110 may modulate the signal using OFDM, with a portion of the bins ("digital bins") allocated for the coarse data and a portion of the bins ("fine bins") allocated to the refinement data. Alternatively, a different modulation and coding scheme may be used for the digital bins and the fine bins, and the fine bins may include properties similar to analog transmission. Alternatively, the same modulation and modulation scheme may be used for the coarse data and the fine data.

Figure 2:
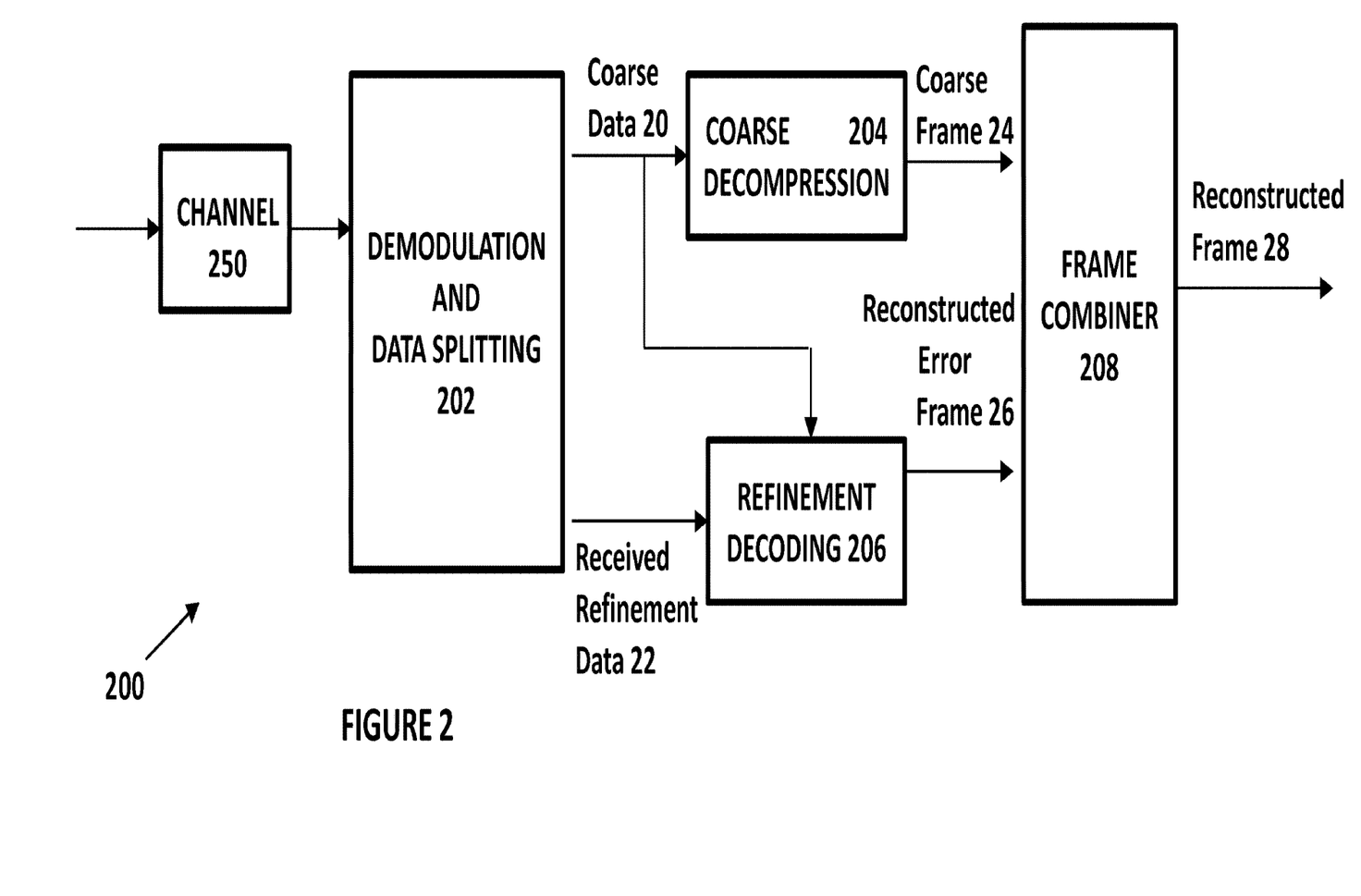
FIG. 2 schematically illustrates an exemplary system for reception and reconstruction of video from a signal received over a communication channel, according to an embodiment of the present invention.

Reference is now made to FIG. 2, which schematically illustrates an exemplary system 200 for reception and reconstruction of video from a signal received over a communication channel 250, according to an embodiment of the present invention. System 200 may include a demodulation and data splitting module 202, a coarse decompression module 204, a refinement decoding module 206, and a frame combiner module 208. System 200 may be used to receive a video signal transmitted by transmission system 100 over channel 150, in which case channel 150 and channel 250 is a same channel.

Demodulation and data splitter module 202 may demodulate the received signal and may split the signal into coarse data 20 and received refinement data 22. Coarse data 20 may be substantially identical to coarse data 12 sent by transmission system 100, and may include a small bit error rate compared to coarse data 12 associated, for example, with packet errors.

Coarse decompression module 204 may decode the video and may generate a coarse frame 24. Coarse decompression module 204 may optionally be a standard video decoder such as, for example, a MPEG decoder, a H.264 decoder, or a H.265 decoder, among other standard video decoders.

Refinement decoding module 206 may receive refinement data 22 and may generate a reconstructed error frame 26. Refinement decoding module 206 may adapt its decoding parameters according to the content of coarse data 20. For example, it may decode from coarse data 20 the value N of the number of transmitted DCT taps and may then reconstruct the DCT values by zeroing all the taps starting from tap N+1.

Frame combiner module 208 may combine the coarse frame 24 with reconstructed error frame 26, for example by summing the two frames together pixel by pixel, optionally reducing a fixed offset (e.g. 128 for 8 bits pixels) and optionally limiting the result between two values, e.g. 0 and 255. Frame combiner module 28 may then generate a reconstructed frame 28.

Figure 3:
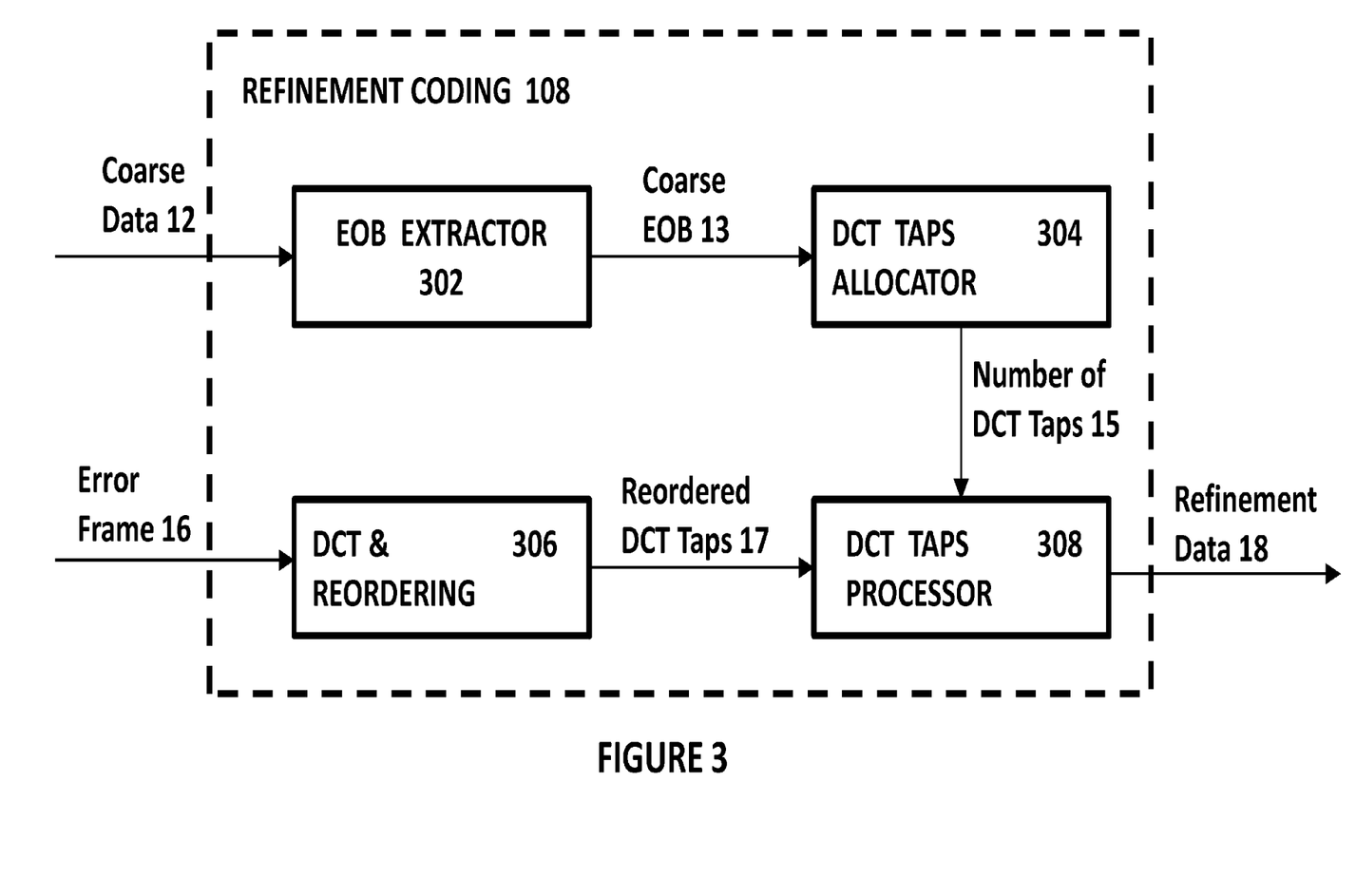
FIG. 3 schematically illustrates an exemplary implementation of a refinement coding module, which may be used in the video compression and transmission system of FIG. 1, according to an embodiment of the present invention.

Reference is now made to FIG. 3, which schematically illustrates an exemplary implementation of refinement coding module 108, which may be used in video compression and transmission system 100, according to an embodiment of the present invention. Refinement coding module 108 may include an EOB (End-Of-Block) extractor module 302, a DCT taps allocator module 304, a DCT and reordering module 306, and a DCT tap processor module 308. A description of refinement coding module 108 and its components is described below with reference to an exemplary mode of operation of system 100.

In an exemplary mode of operation, original frame 10 may be divided into blocks, for example blocks of 8×8 pixels. Coarse compression module 102 may perform a certain transform, for example a two-dimensional DCT, on each block. Coarse compression module 102 may additionally reorder the DCT taps according to a certain predefined order, for example in a. zig-zag order, and may additionally quantize the DCT taps.

EOB extractor module 302 may extract from coarse data 12 the index, or location after reordering, of the last non-zero value of the quantized DCT taps and may transfer this data as coarse EOB 13 to DCT taps allocator module 304. For example, if there are 64 DCT taps, ordered from 1 to 64, and EOB=K, then the quantized values of the taps ordered K+1, K+2, . . . , 64 are all zero.

DCT taps allocator module 304 may determine, for each block, a number of DCT taps 15 that may be used by DCT taps processor module 308 to generate refinement data 18. Optionally, DCT taps allocator module 304 may be implemented by a simple table which may determine for each possible value of coarse EOB location, the number of DCT taps that should be processed by DCT taps processor module 308.

DCT & reordering module 306 may perform a certain transform, for example a two-dimensional DCT, on each block of error frame 16. DCT & reordering module 306 may additionally reorder the DCT taps according to a certain predefined order, for example in a. zig-zag order, and may additionally quantize the DCT taps to generate reordered DC taps 17. DCT taps processor 308 may generate refinement data 18 which may be a linear transform of a subset of reordered DC taps 17 selected by the processor based on the allocated number of DCT taps determined by DCT taps allocator 304.

In some embodiments, an example of an operation of DCT taps allocator 304 may be as follow:

a. Divide original frame 10 into superblocks, with N blocks per superblock (e.g., N=240).

b. Assign a total budget of $M_{Superblock}$ DCT taps per superblock. If all the superblocks are allocated the same value of $M_{Superblock}$, a substantially constant number of DCT taps may be generated for all the superblocks.

c. Receive from EOB extractor module 302 the location $L_i$, i=1, 2, ... N, of the last non-zero quantized DCT tap in coarse data 12.

d. Calculate:

$$\beta = \frac{M_{Superblock}}{\sum_{i=1}^{N} L_i}$$

e. Allocate for each block $L'_i$, DCT taps to be used by DCT taps processor module 308, where:

$$L'_i = \text{round}(\beta L_i)$$

In some embodiments, another example of the operation of DCT taps allocator 304 may be as follows.

a. Divide original frame 10 into superblocks, with N blocks per superblock (e.g., N=240).

b. Assign a total budget of $M_{Superblock}$ DCT taps per superblock.

c. Receive from EOB extractor module 302 the location $L_i$, i=1, 2, ... N, of the last non-zero quantized DCT tap in coarse data 12.

d. Calculate:

$$\beta = \frac{M_{Superblock} - N \cdot L_{min}}{\sum_{i=1}^{N} L_i}$$

e. Allocate for each block $L'_i$, DCT taps to be used by DCT taps processor module 308, where:

$$L'_i = L_{min} + \text{round}(\beta L_i)$$

In some embodiments, another example of the operation of DCT taps allocator module 304 may be as follows:

a. DCT taps allocator module 304 selects the number of DCT taps 15 based both on the coarse EOB 13 and on the reordered DCT taps 17 of error frame 16 (the input of the reordered DCT taps to the DCT taps allocator module is not shown in FIG. 3).

b. Calculate the predictor of the number of taps, rather than the number of taps.

c. Calculate the prediction error which is the difference between the number of DCT taps and the predicted number of DCT taps. The prediction error may then be transmitted to the receiver.

Figure 4:
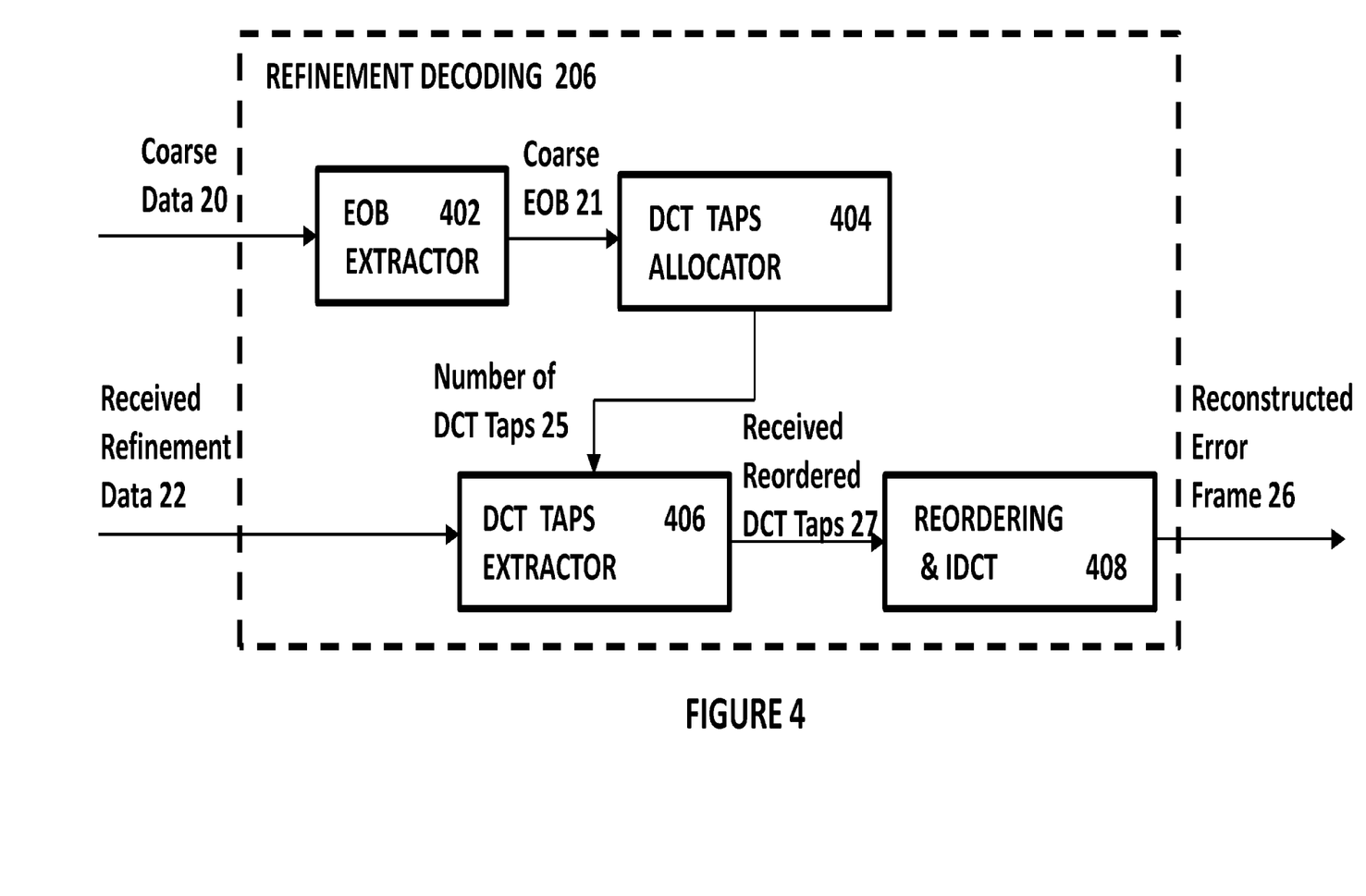
FIG. 4 schematically illustrates an exemplary implementation of a refinement decoding module, which may be used in the system for reception and reconstruction of video shown in FIG. 2, according to an embodiment of the present invention.

Reference is now made to FIG. 4, which schematically illustrates an exemplary implementation of refinement decoding module 206, which may be used in system 200 for reception and reconstruction of video, according to an embodiment of the present invention. Refinement decoding module 206 may include an EOB extractor module 402, a DCT taps allocator module 404, a DCT taps extractor module 406, and a reordering and IDCT module 408.

In some embodiments, as previously discussed with reference to FIG. 2, coarse data 20 may be substantially identical to coarse data 12 sent by transmission system 100, and may include a small bit error rate compared to coarse data 12 associated, for example, with packet errors. As such, EOB extractor module 402 and DCT taps allocator module 404 may be substantially identical or similar to the corresponding refinement coding module 108 shown in FIG. 3. Additionally, number of DCT taps 25 may be substantially identical to number of DCT taps 15 calculated at refinement coding module 108. Therefore, the skilled person may realize that there is no need for transmission system 100 to send the number of DCT taps to reception system 200, thereby allowing for a reduction (saving) in bandwidth. That is, the values $L'_i$, which were calculated in refinement coding module 108 in FIG. 3, may be regenerated in refinement decoding module 206, and there is no need to send them.

DCT taps extractor 406 may generate received reordered DCT taps 27 from the received subset of DCT taps in received refinement data 22 based on the number of DCT taps allocated by DCT taps allocator 404. Reordering & IDCT module may reorder reordered DCT taps 27 and may perform an inverse transform on the DCT taps to generate reconstructed error frame 26.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Some embodiments may include a non-transitory storage medium or storage article having stored thereon instructions or code that, when executed by a machine or a hardware processor, cause such machine or hardware processor to perform a method as described.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "generating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A wireless video transmission system comprising:
   a coarse compression module to compress a video sub-frame and to generate coarse data of said video sub-frame;
   a coarse decompression module to generate a coarse sub-frame from said coarse data;
   an error frame extractor to generate an error sub-frame from said coarse sub-frame and from said video sub-frame;

a refinement data encoder to generate a set of discrete cosine transform (DCT) coefficients from said error sub-frame, and to select only a partial subset of the DCT coefficients;

wherein said refinement data encoder is configured to identify EOB indication in said coarse data; wherein said EOB indication corresponds to a location of a DCT coefficient having the last non-zero value in said coarse data;

wherein the refinement data encoder selects to transmit only a first N of the set of DCT coefficients;

wherein the refinement data encoder selects N according to an end-of-block (EOB) indication in said coarse data and according to a pre-defined function that utilizes a look-up table to describe (I) values of N in the sub-frame as a function of (II) values of the EOB indication in the coarse data of the sub-frame; and a data combining and modulation module to combine and transmit said coarse data and a refinement data comprising said subset of DCT coefficients;

wherein the value of N is not conveyed explicitly to a video decoding device, and wherein the value of N is not encoded and is not sent to said video decoding device; wherein the value of N is conveyed only implicitly to the video decoding device by inserting said EOB indication in said coarse data; wherein a value of said N indicates to the video decoding device a last non-zero DCT coefficient, and indicates to said video decoding device to utilize zero-value DCT coefficients beyond said Nth location of the DCT coefficients.

2. The system according to claim 1,
wherein said refinement data encoder is adapted to reorder said set of transform coefficients in a pre-defined order.

3. The system according to claim 1,
wherein said coarse compression module is adapted to use interframe prediction.

4. The system according to claim 1,
wherein said coarse compression module divides said video sub-frame into superblocks.

5. The system of claim 1,
wherein each original frame of said video is divided into blocks of pixels;
wherein the coarse compression module performs a two-dimensional DCT on each block of pixels, and also re-orders DCT coefficients according to a pre-defined zig-zag order, and also performs quantization of the DCT coefficients;
wherein an EOB Extractor Module of said wireless video transmission system is configured to extract, from coarse data that was encoded by the coarse compression module, a post-reordering location of a last non-zero value of post-quantization DCT coefficients, and is configured to transfer said post-reordering location to a DCT Coefficients Allocator Module;
wherein the DCT Coefficients Allocator Module of said wireless video transmission system is configured to determine, for each block of pixels, a particular number of DCT coefficients that will be used by a DCT Coefficients Processor Module to generate refinement data; wherein the DCT Coefficients Allocator Module utilizes a lookup table that indicates, for each possible value of coarse data EOB location, a corresponding number of DCT coefficients that will be processed by the DCT Coefficients Processor Module to generate refinement data;
wherein the DCT Coefficients Processor Module generates refinement data which is a linear transform of only a subset of re-ordered DCT coefficients that was selected by the DCT Coefficients Processor Module based on an allocated number of DCT coefficients that was allocated by the DCT Coefficients Allocator Module;
wherein the DCT Coefficients Allocator Module is configured to perform:
(a) dividing each original frame into superblocks; wherein each superblock consists of N blocks;
(b) assigning a total budget of DCT coefficients, denoted $M_{superblock}$, to each superblock;
wherein a same total budget of DCT coefficients is assigned to each superblock; wherein a constant number of DCT coefficients is assigned to each superblock;
(c) receiving from the EOB Extractor Module a location, denoted $L_i$, of the last non-zero post-quantization DCT coefficient in the coarse data; wherein i indicates an index number of each block, from 1 to N;
(d) determining a value of DCT coefficient budget, denoted $\beta$, for each block; wherein $$\beta = \frac{M_{Superblock}}{\sum_{i=1}^{N} L_i}$$

(e) allocating for each block a particular number of DCT coefficients, denoted L'i, that will be used by the DCT Coefficients Processor Module for each said block; wherein $$L'_i = \text{round}(\beta L_i)$$

(f) utilizing, and transmitting to the video decoding device, exactly L'i DCT coefficients of refinement video data per each respective block;
wherein a value of L'i is not conveyed explicitly to said video decoding device,
wherein the value of L'i is not encoded and is not sent to said video decoding device;
wherein the value of L'i is conveyed only implicitly to the video decoding device by inserting said EOB indication into said coarse data.

6. The system of claim 1,
wherein each original frame of said video is divided into blocks of pixels;
wherein the coarse compression module performs a two-dimensional DCT on each block of pixels, and also re-orders DCT coefficients according to a pre-defined zig-zag order, and also performs quantization of the DCT coefficients;
wherein an EOB Extractor Module of said wireless video transmission system is configured to extract, from coarse data that was encoded by the coarse compression module, a post-reordering location of a last non-zero value of post-quantization DCT coefficients, and is configured to transfer said post-reordering location to a DCT Coefficients Allocator Module;
wherein the DCT Coefficients Allocator Module of said wireless video transmission system is configured to determine, for each block of pixels, a particular number of DCT coefficients that will be used by a DCT Coefficients Processor Module to generate refinement data; wherein the DCT Coefficients Allocator Module utilizes a lookup table that indicates, for each possible value of coarse data EOB location, a corresponding number of DCT coefficients that will be processed by the DCT Coefficients Processor Module to generate refinement data;

wherein the DCT Coefficients Processor Module generates refinement data which is a linear transform of only a subset of re-ordered DCT coefficients that was selected by the DCT Coefficients Processor Module based on an allocated number of DCT coefficients that was allocated by the DCT Coefficients Allocator Module;

wherein the DCT Coefficients Allocator Module is configured to perform:

(a) dividing each original frame into superblocks; wherein each superblock consists of N blocks;

(b) assigning a total budget of DCT coefficients, denoted $M_{superblock}$, to each superblock;

wherein a same total budget of DCT coefficients is assigned to each superblock; wherein a constant number of DCT coefficients is assigned to each superblock;

(c) receiving from the EOB Extractor Module a location, denoted $L_i$, of the last non-zero post-quantization DCT coefficient in the coarse data; wherein i indicates an index number of each block, from 1 to N;

(d) determining a value of DCT coefficient budget, denoted $\beta$, for each block; wherein $$\beta = \frac{M_{Superblock} - N \cdot L_{min}}{\sum_{i=1}^{N} L_i}$$

(e) allocating for each block a particular number of DCT coefficients, denoted L'i, that will be used by the DCT Coefficients Processor Module for each said block; wherein $$L'_i = L_{min} + \text{round}(\beta L_i)$$

(f) utilizing, and transmitting to the video decoding device, exactly L'i DCT coefficients of refinement video data per each respective block;

wherein a value of L'i is not conveyed explicitly to said video decoding device, wherein the value of L'i is not encoded and is not sent to said video decoding device;

wherein the value of L'i is conveyed only implicitly to the video decoding device by inserting said EOB indication into said coarse data.

7. The system of claim 1, wherein each original frame of said video is divided into blocks of pixels;

wherein the coarse compression module performs a two-dimensional DCT on each block of pixels, and also re-orders DCT coefficients according to a pre-defined zig-zag order, and also performs quantization of the DCT coefficients;

wherein an EOB Extractor Module of said wireless video transmission system is configured to extract, from coarse data that was encoded by the coarse compression module, a post-reordering location of a last non-zero value of post-quantization DCT coefficients, and is configured to transfer said post-reordering location to a DCT Coefficients Allocator Module;

wherein the DCT Coefficients Allocator Module of said wireless video transmission system is configured to determine, for each block of pixels, a particular number of DCT coefficients that will be used by a DCT Coefficients Processor Module to generate refinement data; wherein the DCT Coefficients Allocator Module utilizes a lookup table that indicates, for each possible value of coarse data EOB location, a corresponding number of DCT coefficients that will be processed by the DCT Coefficients Processor Module to generate refinement data;

wherein the DCT Coefficients Processor Module generates refinement data which is a linear transform of only a subset of re-ordered DCT coefficients that was selected by the DCT Coefficients Processor Module based on an allocated number of DCT coefficients that was allocated by the DCT Coefficients Allocator Module;

wherein the DCT Coefficients Allocator Module is configured to perform:

(a) allocating a number, denoted L, of DCT coefficients to be transmitted, based on a re-ordered set of DCT coefficients that the DCT Coefficients Allocator Module receives as input from the error frame extractor;

(b) allocating a number, denoted L', of DCT coefficients based on both (I) a location of the EOB in the coarse data, and (II) said look-up table;

(c) determining a predictor value of the number of DCT coefficients, by utilizing said L' as a predictor for location of the last non-zero coefficient in the refinement data;

(d) determining a prediction error value, based on a difference between L and said predictor value L';

wherein said prediction error value is transmitted to said video decoding device;

wherein a value of L'i is not conveyed explicitly to said video decoding device, wherein the value of L'i is not encoded and is not sent to said video decoding device;

wherein the value of L'i is conveyed only implicitly to the video decoding device by inserting said EOB indication into said coarse data.

8. The system of claim 1, wherein the error frame extractor module is configured to perform a pixel subtraction process, on a pixel by pixel basis, in which each R-G-B value of each pixel in the original frame, is subtracted via subtraction operation from a corresponding R-G-B value of each corresponding pixel in a corresponding frame of compressed coarse data; and wherein an offset value is added via an addition operation to a result of each said subtraction value; and wherein a result of said addition operation is constrained to be within a pre-defined range of values between a pre-defined minimum value and a pre-defined maximum value.

9. The system of claim 1, wherein the error frame extractor module is configured to perform a DCT coefficient subtraction process that is performed on a coefficient-by-coefficient basis in a DCT domain and not in an R-G-B domain, by subtracting (I) a DCT coefficient of a coarse data of a particular frame, from (II) a corresponding DCT coefficient of original video data of a corresponding original frame.

10. A method of wireless video transmission, comprising:

at a coarse compression module, compressing a video sub-frame and to generate coarse data of said video sub-frame;

at a coarse decompression module, generating a coarse sub-frame from said coarse data;

at an error frame extractor, generating an error sub-frame from said coarse sub-frame and from said video sub-frame;

at a refinement data encoder, generate a set of discrete cosine transform (DCT) coefficients from said error sub-frame, and selecting only a partial subset of the DCT coefficients;

at said refinement data encoder, identifying EOB indication in said coarse data; wherein said EOB indication corresponds to a location of a DCT coefficient having the last non-zero value in said coarse data;

at said refinement data encoder, selecting to transmit only a first N of the set of DCT coefficients;

at said refinement data encoder, selecting N according to an end-of-block (EOB) indication in said coarse data and according to a pre-defined function that utilizes a look-up table to describe (I) values of N in the sub-frame as a function of (II) values of the EOB indication in the coarse data of the sub-frame;

at a data combining and modulation module, combining and transmitting said coarse data and a refinement data comprising said subset of DCT coefficients;

wherein the value of N is not conveyed explicitly to a video decoding device, and wherein the value of N is not encoded and is not sent to said video decoding device; wherein the value of N is conveyed only implicitly to the video decoding device by inserting said EOB indication in said coarse data; wherein a value of said N indicates to the video decoding device a last non-zero DCT coefficient, and indicates to said video decoding device to utilize zero-value DCT coefficients beyond said Nth location of the DCT coefficients.

* * * * *